United States Patent
Tamekuni et al.

(10) Patent No.: US 11,156,787 B2
(45) Date of Patent: Oct. 26, 2021

(54) OPTICAL CONNECTOR

(71) Applicants: SUMITOMO ELECTRIC INDUSTRIES, LTD., Osaka (JP); SEI Optifrontier Co., Ltd., Yokohama (JP)

(72) Inventors: Yoshikyo Tamekuni, Osaka (JP); Kazuya Masuda, Osaka (JP); Tomohiko Ueda, Osaka (JP); Yuji Suzuki, Yokohama (JP)

(73) Assignees: SUMITOMO ELECTRIC INDUSTRIES, LTD., Osaka (JP); SEI Optifrontier Co., Ltd., Yokohama (JP)

( * ) Notice: Subject to any disclaimer, the term of this patent is extended or adjusted under 35 U.S.C. 154(b) by 17 days.

(21) Appl. No.: 16/614,867

(22) PCT Filed: May 23, 2018

(86) PCT No.: PCT/JP2018/019811
§ 371 (c)(1),
(2) Date: Nov. 19, 2019

(87) PCT Pub. No.: WO2018/216725
PCT Pub. Date: Nov. 29, 2018

(65) Prior Publication Data
US 2021/0116649 A1    Apr. 22, 2021

(30) Foreign Application Priority Data

May 23, 2017   (JP) .............................. JP2017-102078

(51) Int. Cl.
*G02B 6/00*   (2006.01)
*G02B 6/38*   (2006.01)
(Continued)

(52) U.S. Cl.
CPC .......... *G02B 6/3897* (2013.01); *G02B 6/3616* (2013.01); *G02B 6/3879* (2013.01); *G02B 6/40* (2013.01)

(58) Field of Classification Search
CPC ...... G02B 6/3897; G02B 6/3616; G02B 6/40; G02B 6/3879; G02B 6/00
See application file for complete search history.

(56) References Cited

U.S. PATENT DOCUMENTS 6,318,903 B1   11/2001   Andrews et al.
6,343,950 B1    2/2002   Eginton et al.
(Continued)

FOREIGN PATENT DOCUMENTS

JP       S60-026009 U    2/1985
JP       2009-210669 A   9/2009
(Continued)

*Primary Examiner* — Jennifer Doan
(74) *Attorney, Agent, or Firm* — Faegre Drinker Biddle & Reath LLP (57) ABSTRACT

An optical connector includes a holder configured to hold at least three or more optical connector plugs. The optical connector plugs and the adapters are arranged in an intersecting direction intersecting with a connecting direction. The optical connector plugs include a first optical connector plug and a second optical connector plug. Any of the first optical connector plug and the adapter to which the first optical connector plug is connected has a latch mechanism configured to engage the first optical connector plug with the adapter. Any of the second optical connector plug and the adapter to which the second optical connector plug is connected does not have a latch mechanism configured to engage the second optical connector plug with the adapter.

11 Claims, 7 Drawing Sheets

(51) Int. Cl.
  *G02B 6/36* (2006.01)
  *G02B 6/40* (2006.01)

(56) References Cited

U.S. PATENT DOCUMENTS

| | | |
|---|---|---|
| 6,796,844 B1 | 9/2004 | Edwards, III |
| 6,857,900 B2 | 2/2005 | Kleeberger et al. |
| 7,140,911 B1 | 11/2006 | Rector et al. |
| 8,920,043 B2 | 12/2014 | Iwaya et al. |
| 9,069,149 B2 | 6/2015 | Yu |
| 9,146,362 B2 * | 9/2015 | Marcouiller ......... G02B 6/3833 |
| 10,802,223 B2 * | 10/2020 | Lee ..................... G02B 6/3825 |
| 2009/0274432 A1 | 11/2009 | Iwaya |
| 2011/0091158 A1 | 4/2011 | Iwaya et al. |
| 2014/0016902 A1 * | 1/2014 | Pepe .................... G02B 6/3895 |
| | | 385/76 |
| 2014/0161397 A1 | 6/2014 | Gallegos et al. |
| 2014/0241671 A1 | 8/2014 | Koreeda et al. |
| 2014/0270675 A1 | 9/2014 | Yu |
| 2015/0346438 A1 | 12/2015 | Kato |

FOREIGN PATENT DOCUMENTS

| | | |
|---|---|---|
| JP | 2012-242781 A | 12/2012 |
| WO | WO-2009/110421 A1 | 9/2009 |

* cited by examiner

OPTICAL CONNECTOR

TECHNICAL FIELD

An aspect of the present disclosure relates to an optical connector including a plurality of optical connector plugs collectively connected.

The present application claims the benefit of priority based on Japanese Patent Application No. 2017-102078 filed on May 23, 2017, the content of which is entirely incorporated herein by reference.

BACKGROUND ART

Patent Literature 1 describes an optical connector that collectively inserts and removes a plurality of optical connector plugs. This optical connector includes three plug units, a housing integrally covering around these three plug units, and a support flat plate configured to support the three plug units on the inner side of the housing. Each of the three plug units includes a lock mechanism configured to engage with an adapter.

CITATION LIST

Patent Literature

Patent Literature 1: Japanese Unexamined Patent Publication No. 2012-242781

SUMMARY OF INVENTION

An optical connector according to an embodiment of the present disclosure is an optical connector including at least three or more optical connector plugs collectively connected to a plurality of adapters along a connecting direction. The optical connector includes a holder configured to hold the at least three or more optical connector plugs. The optical connector plugs and the adapters are arranged in an intersecting direction intersecting with the connecting direction. The optical connector plugs include a first optical connector plug and a second optical connector plug. Any of the first optical connector plug and the adapter to which the first optical connector plug is connected has a latch mechanism configured to engage the first optical connector plug with the adapter. Any of the second optical connector plug and the adapter to which the second optical connector plug is connected does not have a latch mechanism configured to engage the second optical connector plug with the adapter.

DESCRIPTION OF EMBODIMENTS

Problem to be Solved by the Present Disclosure

In conventional optical connectors, there are multiple places where an optical connector plug engages with an adapter. In the above-described optical connector, all the optical connector plugs are individually provided with a latch mechanism (a lock mechanism). In the case where many latch mechanisms are provided, it is assumed that a large pressing force is necessary in pressing the optical connector plugs.

When the optical connector plugs are inserted into the adapters to engage with the optical connector plugs, sounds are generated due to the latch mechanisms. Thus, in the case where a plurality of optical connector plugs is collectively engaged, sounds are generated by the number of the optical connector plugs. Therefore, in the case where the number of the optical connector plugs is large, the number of sounds generated is large, and hence a problem can arise in that it is difficult to determine whether all the optical connector plugs are sufficiently inserted.

An object of the present disclosure is to provide an optical connector that can decrease the pressing force of optical connector plugs and can easily determine whether the optical connector plugs are sufficiently inserted.

Effect of the Present Disclosure

According to the present disclosure, the pressing force of optical connector plugs can be decreased, and it can be easily determined whether the optical connector plugs are sufficiently inserted.

DESCRIPTION OF EMBODIMENTS

First, the content of an embodiment of the present disclosure will be described in list. An optical connector according to an embodiment of the present disclosure is an optical connector including at least three or more optical connector plugs collectively connected to a plurality of adapters along a connecting direction. The optical connector includes a holder configured to hold the at least three or more optical connector plugs. The optical connector plugs and the adapters are arranged in an intersecting direction intersecting with the connecting direction. The optical connector plugs include a first optical connector plug and a second optical connector plug. Any of the first optical connector plug and the adapter to which the first optical connector plug is connected has a latch mechanism configured to engage the first optical connector plug with the adapter. The second optical connector plug and the adapter to which the second optical connector plug is connected does not have a latch mechanism configured to engage the second optical connector plug with the adapter.

In the optical connector according to the embodiment of the present disclosure, any of the first optical connector plug and the adapter to which the first optical connector plug is connected has the latch mechanism. In contrast to this, the second optical connector plug and the adapter to which the second optical connector plug is connected does not have a latch mechanism configured to engage the second optical connector plug with the adapter. As described above, the latch mechanism is provided alone on any of the first optical connector plug and the adapter to which the first optical connector plug is connected, and hence the number of the latch mechanisms can be reduced. Therefore, the number of the latch mechanisms is reduced, and hence the pressing force necessary for the insertion of the optical connector plugs can be reduced. The number of the latch mechanisms is reduced, and hence even in the case where the number of the optical connector plugs is large, the number of sounds to be generated can be reduced. Therefore, an operator who inserts and removes the optical connector can easily recognize the engagement of the latch mechanism. Thus, it can be easily determined whether the optical connector plugs are sufficiently inserted.

The second optical connector plugs are individually disposed on both end sides in the intersecting direction, and the first optical connector plugs may be disposed between the plurality of second optical connector plugs. In this case, the latch mechanism can be removed from the second optical connector plugs on both end sides in the intersecting direction in which it is easily confirmed whether the optical connector plugs are inserted. The engagement of the first optical connector plugs located on the center side in the intersecting direction is confirmed, and hence it can be regarded that all the optical connector plugs are sufficiently inserted into the adapters. Therefore, it can be easily determined whether the optical connector plugs are sufficiently inserted into the adapters.

Both of the first optical connector plug and the second optical connector plug have an optical fiber and a ferrule configured to hold the optical fiber, and the end portion of the ferrule of the second optical connector plug may be located on the adapter side beyond the end portion of the ferrule of the first optical connector plug. In this case, the end portion of the ferrule of the second optical connector plug is located on the adapter side beyond the end portion of the ferrule of the first optical connector plug. Thus, when the first optical connector plug engages with the adapter, the second optical connector plug is more surely inserted into the adapter. Therefore, the insertion of all the optical connector plugs can be more surely performed.

The second optical connector plug may protrude on the adapter side beyond the first optical connector plug. In this case, the second optical connector plug itself protrudes on the adapter side beyond the first optical connector plug, and hence the positional relationship between the optical connector plug and the ferrule can be common between the second optical connector plug and the first optical connector plug. That is, the amount of the ferrule protruding from the first optical connector plug and the amount of the ferrule protruding from the second optical connector plug can be made the same. Therefore, common optical connector plugs can be used as the first optical connector plug and the second optical connector plug, and hence the optical connector can be easily produced.

The optical connector according to an embodiment may include a grip part configured to grip the holder. In this case, the insertion and removal of the plurality of optical connector plugs can be collectively performed with the grip part gripped. Thus, the insertion and removal of the plurality of optical connector plugs into and from the plurality of adapters can be easily performed.

The optical connector according to an embodiment may include at least one or more connector plug groups having six optical connector plugs arranged in the intersecting direction. In this case, the insertion and removal of six or more optical connector plugs can be collectively performed. Therefore, the number of times of insertion and removal can be reduced to 1/6 or less, compared with the case where the optical connector plugs are inserted and removed one by one.

Detail of an Embodiment

In the following, a specific example of an optical connector according to an embodiment of the present disclosure will be described with reference to the drawings. Note that the present disclosure is not limited to examples below, and intended to include all modifications shown in claims and in the range equivalent to claims. In the following description, in the description of the drawings, the same or corresponding elements are designated with the same reference signs, and the duplicate description is appropriately omitted.

Figure 1:
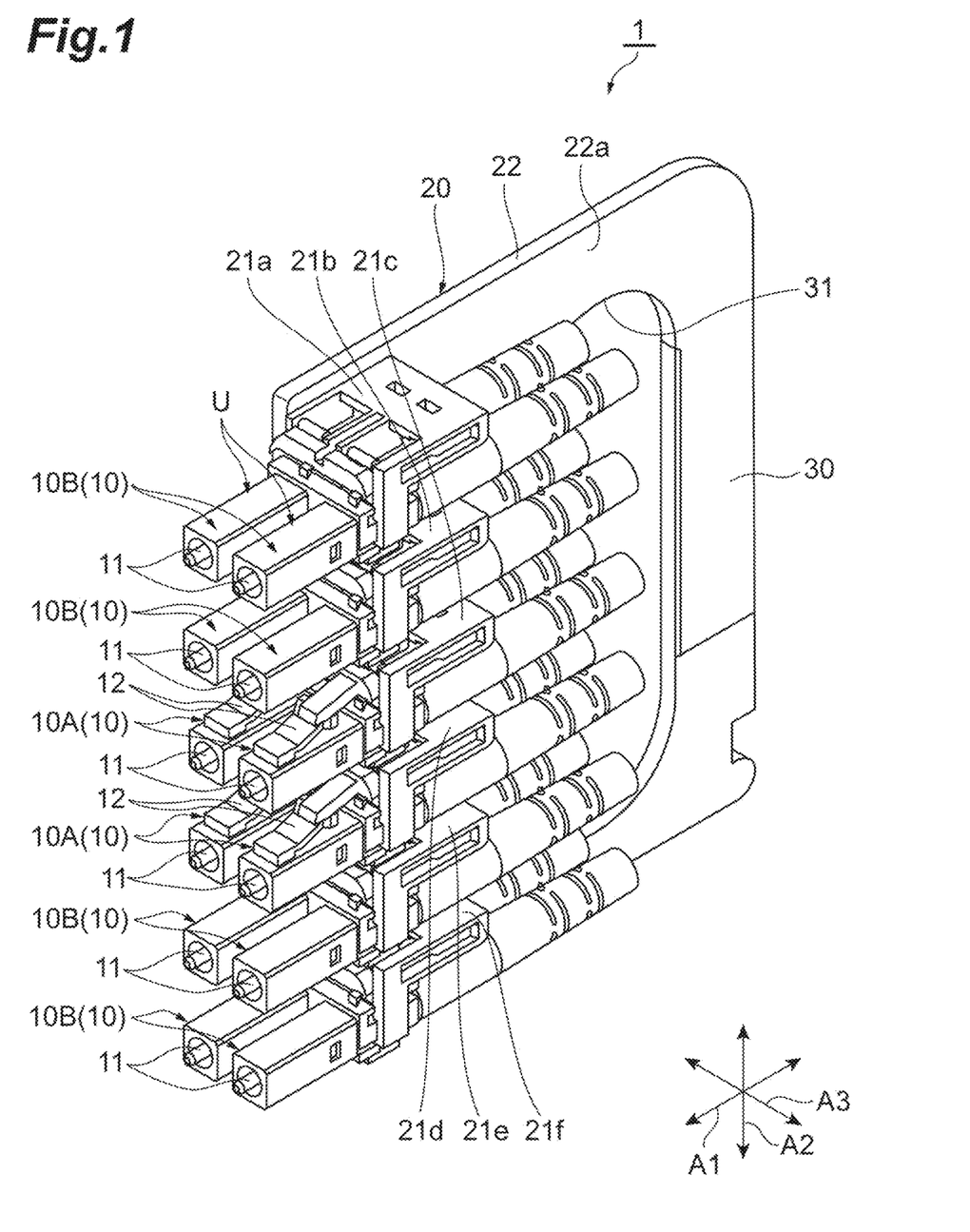
FIG. 1 is a perspective view showing an optical connector according to an embodiment.
Figure 2:
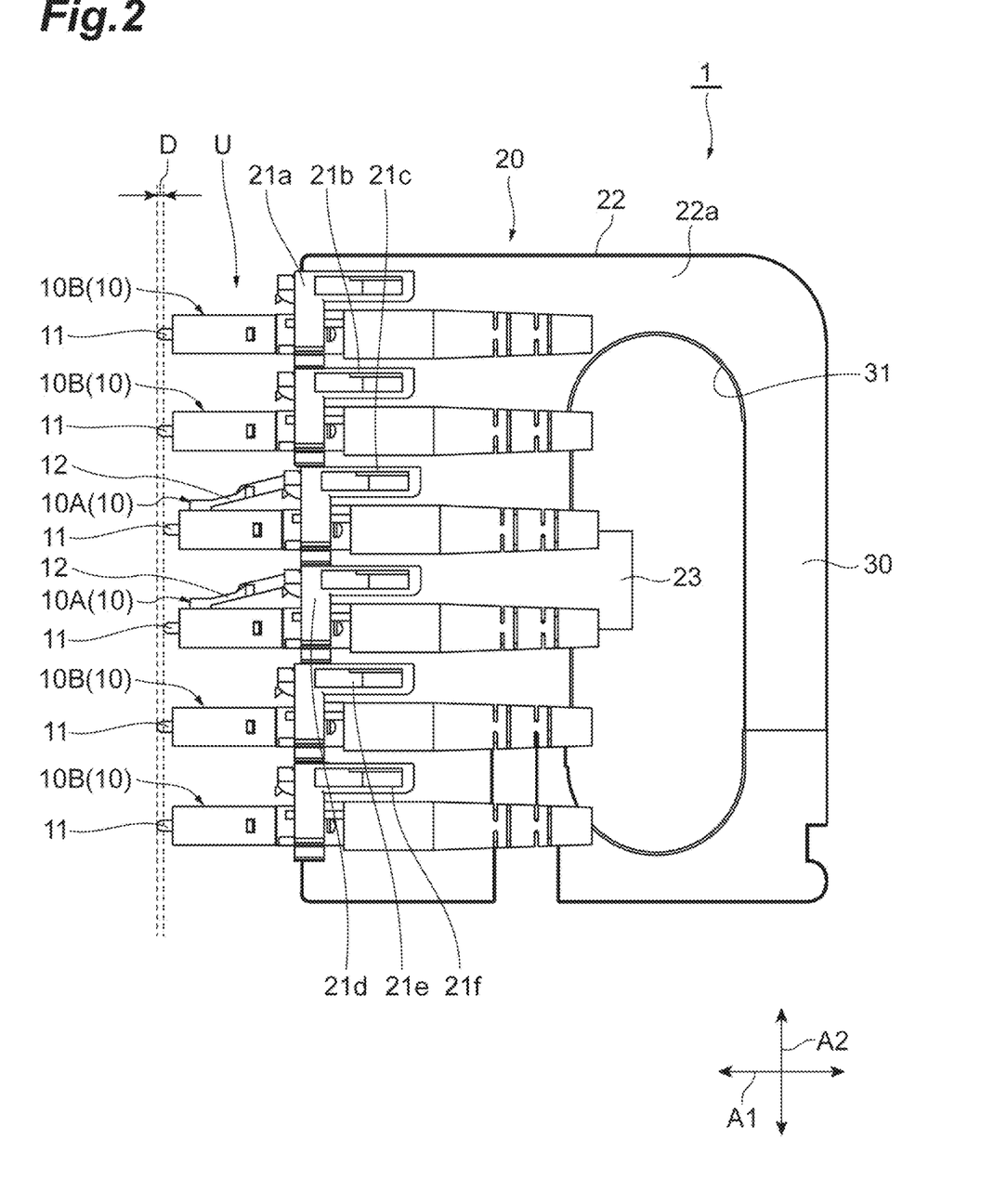
FIG. 2 is a side view of the optical connector in FIG. 1.

FIG. 1 is a perspective view showing an optical connector according to an embodiment. FIG. 2 is a side view showing the optical connector shown in FIG. 1. The optical connector 1 belongs to an inspection apparatus that inspects optical communications between a plurality of data centers, for example. On the racks of the data center, an optical wiring rack to which a plurality of optical fibers is fused is provided. The optical connector 1 is connected to a plurality of adapters disposed on the optical wiring rack, and hence the inspection of optical communications is performed.

Nowadays, in association with an increase in data communication volumes, the development of the above-described optical wiring rack that meets multicore fibers is advancing, and the number of the adapters is increasing. For example, the number of adapters provided on one optical wiring rack is 288. Since the optical connector 1 is collectively inserted into and removed from a plurality of adapters, the time necessary for insertion and removal can be reduced even though the number of the adapters is large.

As shown in FIGS. 1 and 2, the optical connector 1 includes 12 optical connector plugs 10 connected to adapters, a holder 20 configured to hold these 12 optical connector plugs 10, and a grip part 30 configured to grip the holder 20. The optical connector 1 includes two connector plug groups U. The connector plug groups U are each configured of six optical connector plugs 10.

The optical connector 1 is connected to the adapters along a connecting direction A1. The optical connector plugs 10 and the adapters are arranged along an intersecting direction A2 intersecting with the connecting direction A1. The connecting direction A1 is a direction in which the optical connector plug 10 protrudes from the holder 20, for example, and the intersecting direction A2 is a direction orthogonal to the connecting direction A1. The optical connector plugs 10 of the connector plug group U are disposed along the intersecting direction A2.

The optical connector plugs 10 include a first optical connector plug 10A and a second optical connector plug 10B. Both of the first optical connector plug 10A and the second optical connector plug 10B have an optical fiber and a ferrule 11 configured to hold the optical fiber. The second optical connector plugs 10B are disposed on both end sides in the intersecting direction A2. The first optical connector plugs 10A are disposed between the plurality of second optical connector plugs 10B in the intersecting direction A2.

In the six optical connector plugs 10 included in each of the connector plug groups U, two optical connector plugs 10 on the center side in the intersecting direction A2 are the first optical connector plugs 10A. In the six optical connector plugs 10 included in each of the connector plug groups U, two optical connector plugs 10 on both end sides in the intersecting direction A2 are the second optical connector plugs 10B. That is, in the six optical connector plugs 10 included in the connector plug group U, the optical connector plugs 10 except the first optical connector plugs 10A are the second optical connector plugs 10B.

The end portion of the ferrule 11 extending from the second optical connector plug 10B is located on the adapter side (on the outer side of the optical connector 1) beyond the end portion of the ferrule 11 extending from the first optical connector plug 10A. A protrusion amount D of the end portion of the ferrule 11 of the second optical connector plug 10B to the end portion of the ferrule 11 of the first optical connector plug 10A is 0.1 mm or more and 0.5 mm or less, for example.

The first optical connector plug 10A is an LC connector. The first optical connector plug 10A has a latch mechanism 12 configured to engage with the adapter. On the other hand, the second optical connector plug 10B does not have a latch mechanism. The second optical connector plug 10B is an LC connector from which a latch mechanism is removed, for example. For example, the points other than the presence or absence of the latch mechanism 12 are common between the first optical connector plug 10A and the second optical connector plug 10B.

Figure 3:
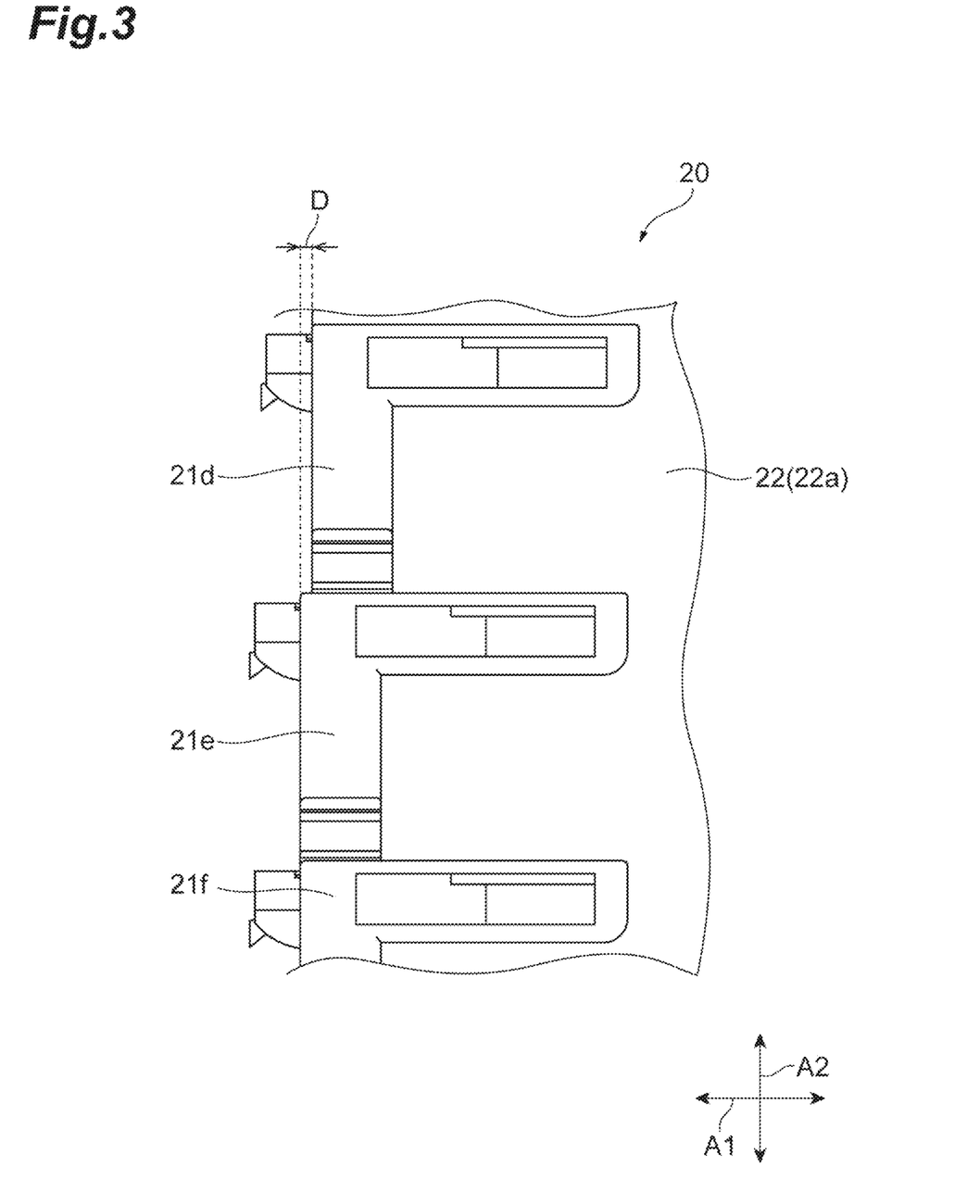
FIG. 3 is a side view showing a part of the holder of the optical connector in FIG. 1.

Next, referring to FIGS. 1 to 3, the holder 20 will be described. FIG. 3 is a side view showing a part of the holder 20 of the optical connector 1. The holder 20 has six plug holding parts 21a to 21f configured to individually hold the optical connector plugs 10, a support part 22 fixed to the plug holding parts 21a to 21f, and a pressing part 23 provided on the support part 22.

The plug holding parts 21a to 21f are arranged along the intersecting direction A2. Each of the plug holding parts 21a to 21f has a common structure, for example. The support part 22 is in a plate shape, and has a main face 22a to which the plug holding parts 21a to 21f are fixed. The main face 22a is directed to one side in a direction A3. The direction A3 is a direction intersecting with both of the connecting direction A1 and the intersecting direction A2, e.g. a direction orthogonal to both of the connecting direction A1 and the intersecting direction A2, for example.

Each of the plug holding parts 21a to 21f holds two optical connector plugs 10 arranged in the direction A3. Each of the plug holding parts 21a, 21b, 21e, and 21f holds the second optical connector plugs 10B, and each of the plug holding parts 21c and 21d holds the first optical connector plugs 10A.

The plug holding parts 21a, 21b, 21e, and 21f protrude on the adapter side beyond the plug holding parts 21c and 21d. The protrusion amounts of the optical connector plugs 10 from the plug holding parts 21a to 21f are the same, for example. Thus, the plug holding parts 21a, 21b, 21e, and 21f protrude on the adapter side beyond the plug holding parts 21c and 21d, and hence the end portion of the ferrule 11 of the second optical connector plug 10B protrudes on the adapter side beyond the end portion of the ferrule 11 of the first optical connector plug 10A.

The grip part 30 is provided on the opposite side of the adapter when viewed from the optical connector plug 10. The grip part 30 has an opening 31 penetrating the support part 22 in the direction A3. A finger is inserted into this opening 31 to grip the grip part 30, and hence the optical connector 1 can be gripped with hand. The opening 31 is included, and hence the grip part 30 has a shape easily gripped. The opening 31 is in an oblong shape extending along the intersecting direction A2, for example. For example, the grip part 30 is integrally formed with the holder 20. However, the grip part 30 may be a separate part from the holder 20.

The pressing part 23 is a part pressed on the adapter side. The pressing part 23 is provided at a place corresponding to the first optical connector plugs 10A. That is, the pressing part 23 extends along the connecting direction A1 together with the first optical connector plugs 10A, and a part of the pressing part 23 protrudes from the first optical connector plug 10A to the opposite side of the adapter. The pressing part 23 is fixed to the support part 22, for example. The pressing part 23 protrudes on the inner side of the opening 31, for example. The pressing part 23 is pressed on the adapter side, and hence pressing force is transmitted to the first optical connector plug 10A. The first optical connector plugs 10A are directly pressed by the pressing part 23, and hence the first optical connector plugs 10A can be more easily engaged with the adapter.

Note that the configuration of the pressing part 23 is not limited to the above-described example, and can be appropriately modified. For example, the pressing part 23 may be slid to the support part 22. The pressing part 23 may be fixed to the first optical connector plugs 10A. In this case, the pressing part 23 is pressed, and hence the first optical connector plugs 10A can be directly pressed into the adapters.

Figure 4:
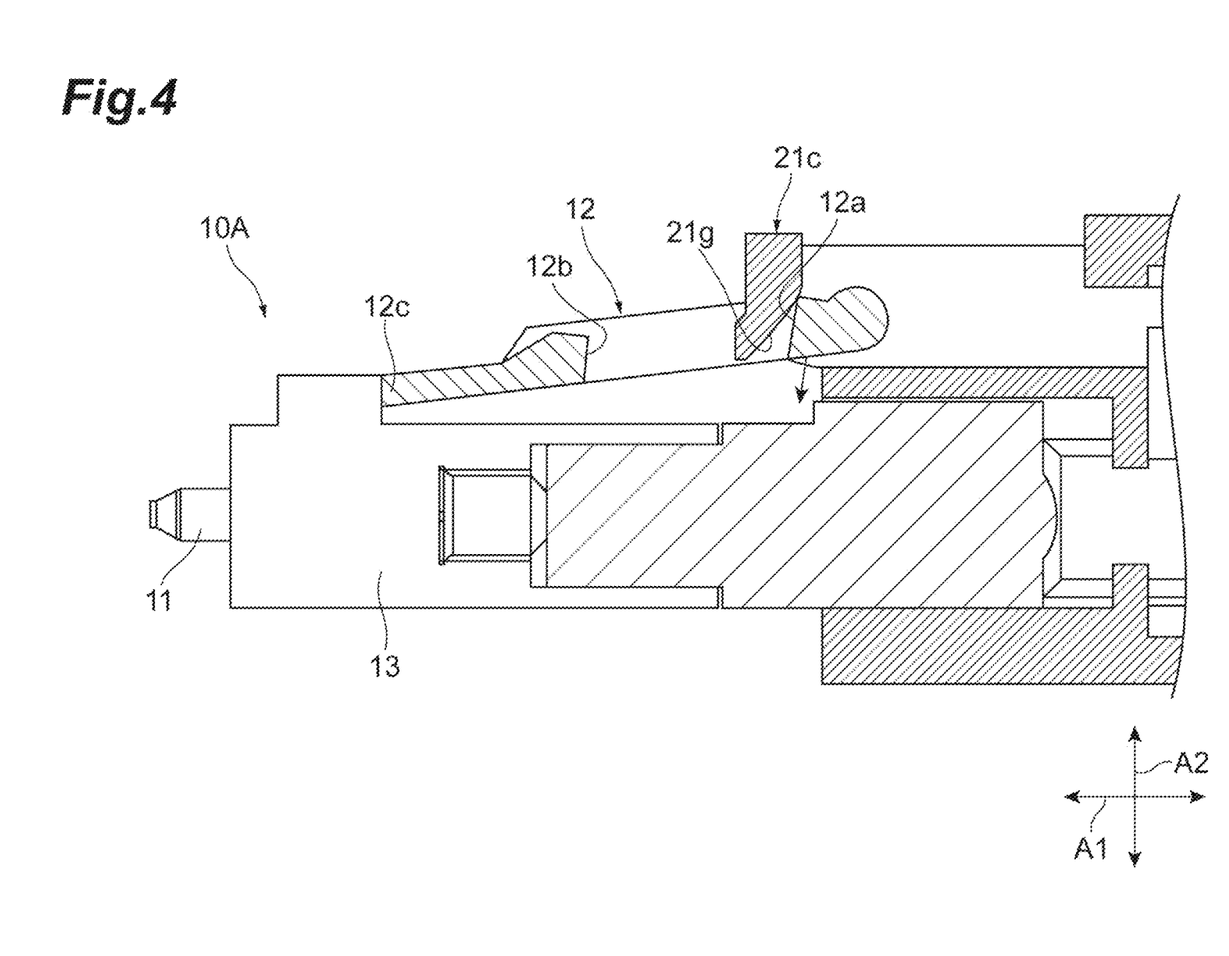
FIG. 4 is a view showing the first optical connector plug and the plug holding part of the optical connector in FIG. 1.

Next, referring to FIG. 4, the first optical connector plug 10A will be described in detail. FIG. 4 is a view showing the first optical connector plug 10A and the plug holding part 21c. Note that since the relationship between the plug holding part 21d and the first optical connector plug 10A is the same as the relationship between the plug holding part 21c and the first optical connector plug 10A, and the description is omitted.

The first optical connector plug 10A further includes a housing 13 covering the ferrule 11. The latch mechanism 12 is in a plate shape along the connecting direction A1 and extending diagonally above. The latch mechanism 12 is made of a resin material, for example. The latch mechanism 12 has a contacting part 12a configured to contact the plug holding part 21c and an engaging part 12b configured to engage with the adapter. The adapter side of the engaging part 12b is a fixing portion 12c fixed to the housing 13. The contacting part 12a is provided on the opposite side of the adapter when viewed from the engaging part 12b.

On the first optical connector plug 10A and the plug holding part 21c, a so-called push-pull mechanism is provided. The holder 20 is pulled out in the connecting direction A1 using this push-pull mechanism, and hence the engagement of the first optical connector plug 10A with the adapter can be released. The first optical connector plug 10A is slidable in the connecting direction A1 to the plug holding part 21c.

The latch mechanism 12 bends in the intersecting direction A2 at the base point that is the fixing portion 12c, and hence the contacting part 12a is movable along the intersecting direction A2. At the portion at which the plug holding part 21c contacts the contacting part 12a, an inclined plane 21g is formed, being inclined both in the connecting direction A1 and in the intersecting direction A2. With the pulling out of the holder 20, when the plug holding part 21c is slid on the opposite side of the adapter, the contacting part 12a is pressed down by the inclined plane 21g. As a result, the latch mechanism 12 is entirely pressed down, and hence the engagement of the engaging part 12b with the adapter is released. The first optical connector plug 10A can be pulled out of the adapter.

Figure 5:
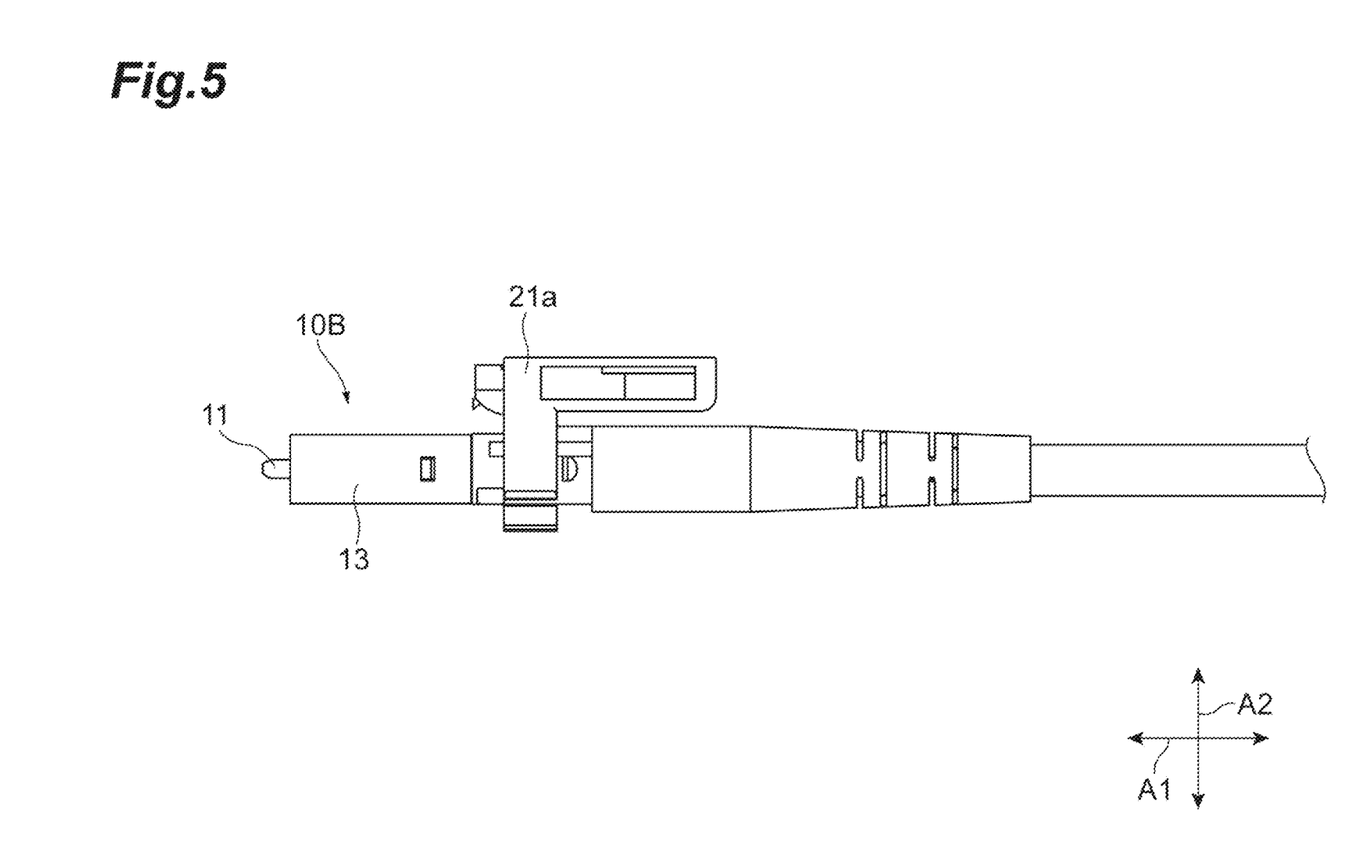
FIG. 5 is a view showing the second optical connector plug and the plug holding part of the optical connector in FIG. 1.

Next, referring to FIG. 5, the second optical connector plug 10B will be described. FIG. 5 is a view showing the second optical connector plug 10B and the plug holding part 21a. Note that the relationship between the second optical connector plug 10B and each of the plug holding parts 21b, 21e, and 21f is the same as the relationship between the second optical connector plug 10B and the plug holding part 21a, and the description is omitted.

Similarly to the first optical connector plug 10A, the second optical connector plug 10B further includes a housing 13. The second optical connector plug 10B is different from the first optical connector plug 10A in that the second optical connector plug 10B is fixed to the plug holding part 21a. That is, the second optical connector plug 10B is not slidable to the plug holding part 21a, and moves along the connecting direction A1 together with the plug holding part 21a. The second optical connector plug 10B can be freely inserted into and removed from the adapter by moving the holder 20 (the plug holding part 21a) along the connecting direction A1.

Next, an exemplary manipulation of collectively inserting and removing the plurality of optical connector plugs 10 into and from the plurality of adapters with the optical connector 1 will be described. First, the grip part 30 is gripped, and the plurality of optical connector plugs 10 is collectively inserted into the adapters. Subsequently, the pressing part 23 is pressed on the adapter side, and the latch mechanisms 12 of the plurality of first optical connector plugs 10A are engaged with the adapters. At this time, sounds generated from the latch mechanism 12 are confirmed, and hence it is confirmed that the first optical connector plugs 10A are sufficiently inserted. Since the second optical connector plug 10B protrudes on the adapter side beyond the first optical connector plug 10A, it can be regarded that all the optical connector plugs 10 are sufficiently inserted into the adapters when the insertion of the first optical connector plugs 10A can be confirmed.

When the plurality of optical connector plugs 10 is collectively pulled out of the adapters, the grip part 30 is gripped, and the optical connector 1 is pulled out of the adapters. At this time, since the second optical connector plug 10B does not have a latch mechanism configured to engage with the adapter, the second optical connector plug 10B can be pulled out as it is. On the other hand, before the optical connector 1 is pulled out, the latch mechanism 12 of the first optical connector plug 10A engages with the adapter. When the optical connector 1 is pulled out in this state, the plug holding parts 21c and 21d move on the opposite side of the adapter, and the inclined plane 21g presses down the latch mechanism 12. With the pressing down of the latch mechanism 12, the engagement of the first optical connector plug 10A with the adapter is released, and all the optical connector plugs 10 are collectively pulled out of the adapters.

Next, the operation and the effect obtained from the optical connector 1 according to the embodiment 1 will be described.

In the optical connector 1, the first optical connector plug 10A has the latch mechanism 12. In contrast to this, the second optical connector plug 10B and the adapter connected to the second optical connector plug 10B do not have a latch mechanism configured to the second optical connector plug 10B engage with the adapter. As described above, the first optical connector plug 10A alone includes the latch mechanism 12, and hence the number of the latch mechanisms 12 can be reduced, compared with the case where all the optical connector plugs include the latch mechanism.

Therefore, the number of the latch mechanisms 12 is reduced, and hence the pressing force necessary for the insertion of the optical connector plugs 10 can be reduced. The number of the latch mechanisms 12 is reduced, and hence even in the case where the number of the optical connector plugs 10 is large, the number of sounds to be generated can be reduced. Therefore, the operator who inserts and removes the optical connector 1 can easily recognize the engagement of the latch mechanism 12. Thus, it can be easily determined whether the optical connector plugs 10 are sufficiently inserted.

The second optical connector plugs 10B are individually disposed on both end sides in the intersecting direction A2, and the first optical connector plugs 10A are disposed between the plurality of second optical connector plugs 10B. Thus, the latch mechanisms can be removed from the second optical connector plugs 10B on both end sides in the intersecting direction A2 in which it is easily determined whether the optical connector plugs 10 are inserted. The engagement of the first optical connector plugs 10A located on the center side in the intersecting direction A2 is confirmed, and hence it can be regarded that all the optical connector plugs 10 are sufficiently inserted into the adapters. Therefore, it can be easily determined whether the optical connector plugs 10 are sufficiently inserted into the adapters.

Both of the first optical connector plug 10A and the second optical connector plug 10B have the optical fiber and the ferrule 11 configured to hold the optical fiber. The end portion of the ferrule 11 of the second optical connector plug 10B is located on the adapter side beyond the end portion of the ferrule 11 of the first optical connector plug 10A. Thus, when the first optical connector plug 10A engages with the adapter, the second optical connector plug 10B is more surely inserted into the adapter. Therefore, the insertion of all the optical connector plugs 10 can be more surely performed.

The second optical connector plug 10B protrudes on the adapter side beyond the first optical connector plug 10A. Thus, the second optical connector plug 10B itself protrudes on the adapter side beyond the first optical connector plug 10A, and hence the positional relationship between the optical connector plug 10 and the ferrule 11 can be common between the second optical connector plug 10B and the first optical connector plug 10A. That is, the amount of the ferrule 11 protruding from the first optical connector plug 10A and the amount of the ferrule 11 protruding from the second optical connector plug 10B can be made the same. Therefore, common optical connector plugs 10 can be used as the first optical connector plug 10A and the second optical connector plug 10B, and hence the optical connector 1 can be easily produced.

The optical connector 1 includes the grip part 30 configured to grip the holder 20. Thus, the insertion and removal of the plurality of optical connector plugs 10 can be collectively performed with the grip part 30 gripped. Thus, the insertion and removal of the plurality of optical connector plugs 10 into and from the plurality of adapters can be easily performed.

The optical connector 1 has two connector plug groups U in which six optical connector plugs 10 are arranged in the intersecting direction A2. Thus, the insertion and removal of 12 (6×2) optical connector plugs 10 can be collectively performed. Therefore, the number of times of insertion and removal can be reduced to $\frac{1}{12}$, compared with the case where the optical connector plugs are inserted and removed one by one.

As described above, the embodiment of the present disclosure is described. However, the present disclosure is not limited to the above-described embodiment, and can be variously modified. For example, in the foregoing embodiment, an example is described in which the latch mechanism 12 is provided on the first optical connector plug 10A.

However, the latch mechanism may be provided on the adapter to which the first optical connector plug 10A is connected.

Figure 6:
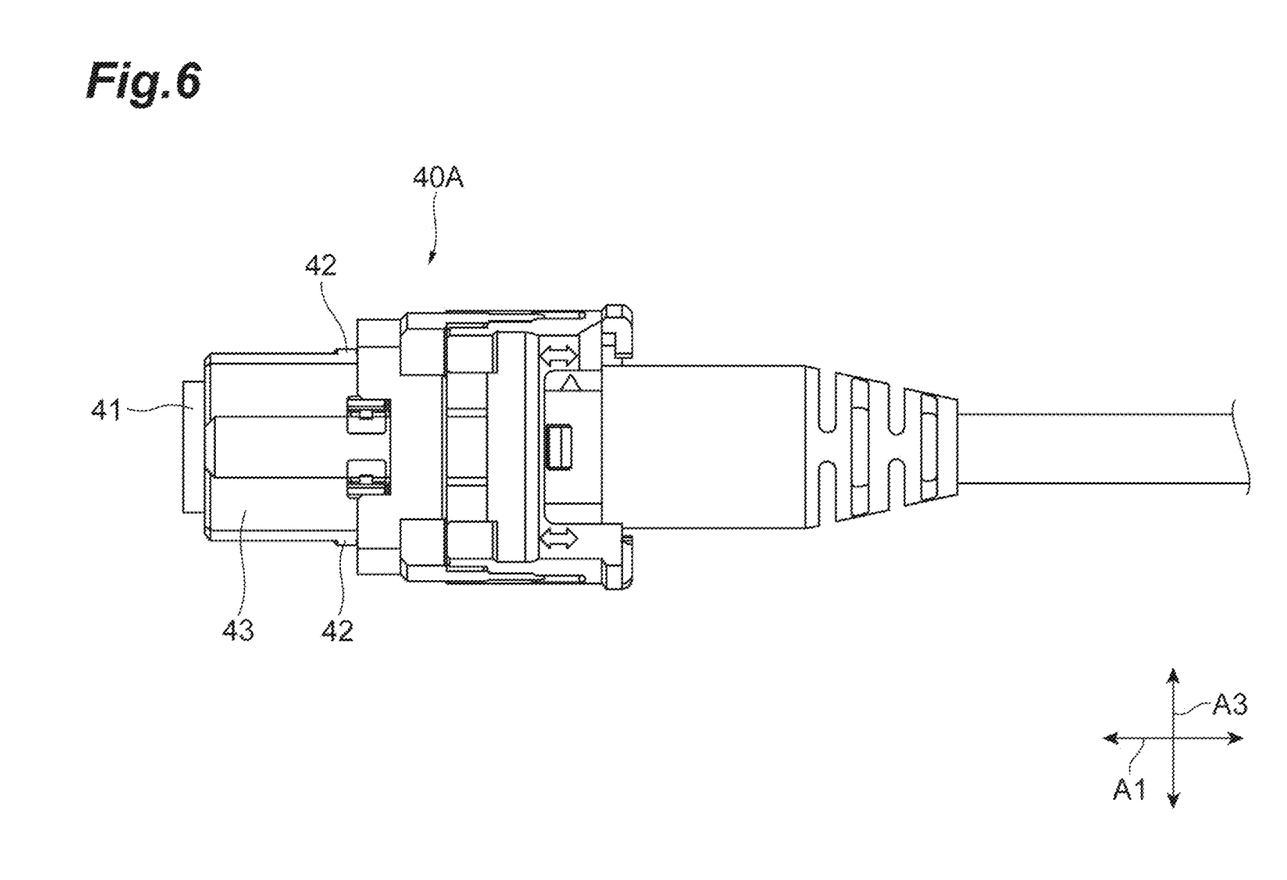
FIG. 6 is a view showing a first optical connector plug according to an exemplary modification.
Figure 7:
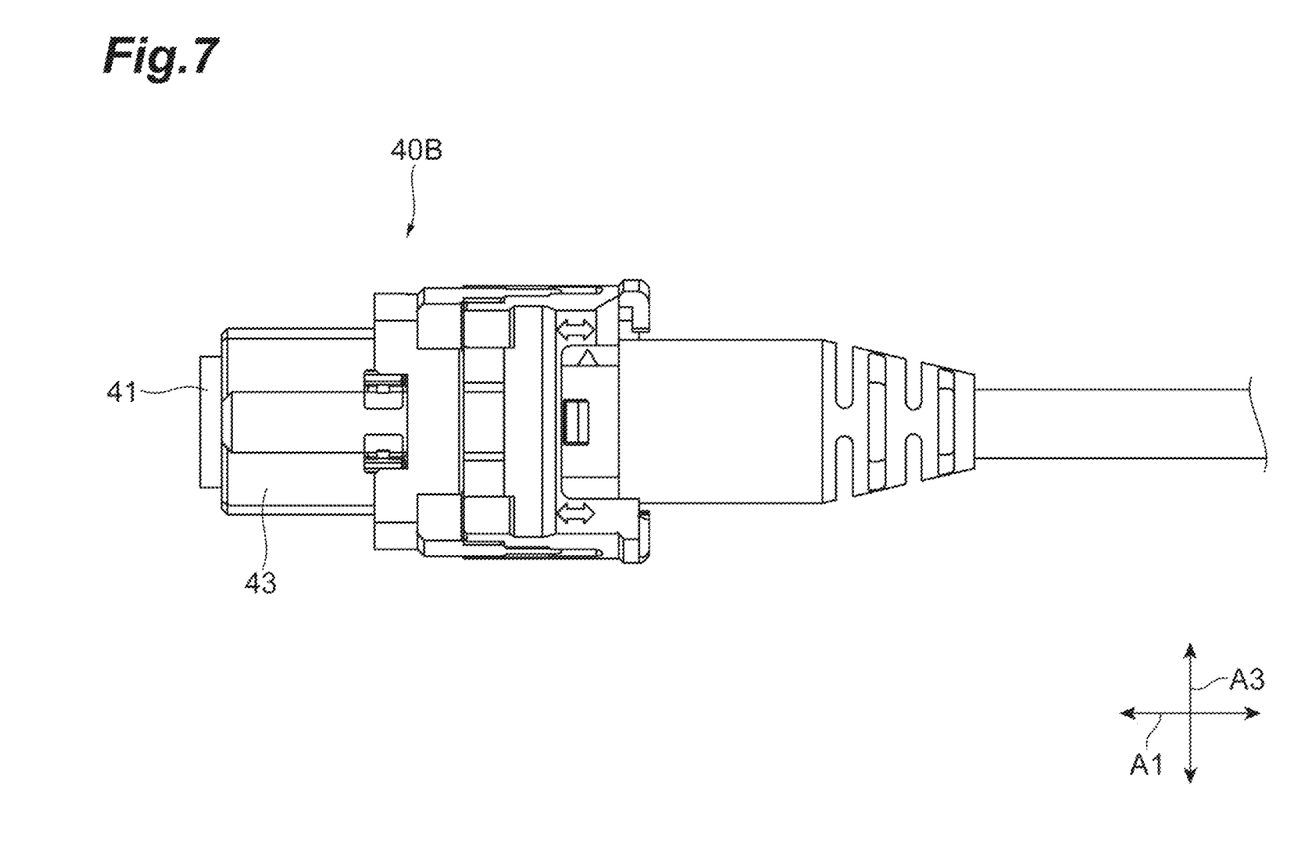
FIG. 7 is a view showing a second optical connector plug according to the exemplary modification.

FIG. 6 is a view showing a first optical connector plug 40A according to an exemplary modification, and FIG. 7 is a view showing a second optical connector plug 40B according to the exemplary modification. Both of the first optical connector plug 40A and the second optical connector plug 40B are MPO connectors. As shown in FIG. 6, the first optical connector plug 40A has an optical fiber, a ferrule 41 configured to hold the optical fiber, an engaged part 42 engaged with a latch mechanism provided on an adapter, and a housing 43 covering a ferrule 41.

The engaged parts 42 of the first optical connector plugs 40A are individually provided on both sides of the housing 43 in the direction A3. The engaged part 42 is in a raised shape, for example. The second optical connector plug 40B has a configuration similar to the configuration of the first optical connector plug 40A, and is different from the first optical connector plug 40A in that the second optical connector plug 40B does not have the engaged part 42. As described above, the first optical connector plug 40A alone has the engaged part 42, and hence the number of the latch mechanisms can be reduced, compared with the case where all the optical connector plugs have the engaged part. Therefore, even the first optical connector plug 40A and the second optical connector plug 40B that are MPO connectors can obtain the effect similar to the above-described effect.

The optical connector plug may be an SC connector. In this case, the latch mechanism is provided on the adapter, and the engaged part is provided on the first optical connector plug alone. Even in the case where the optical connector plug is an SC connector, the latch mechanism is removed from the second optical connector plug and the adapter to which the second optical connector plug is connected, and hence the effect similar to the above-described effect can be obtained.

In the foregoing embodiment, the second optical connector plug 10B from which the latch mechanism is removed is described. However, instead of the second optical connector plug 10B from which the latch mechanism is removed, a second optical connector plug may be provided in which the latch mechanism 12 is fixed to the housing 13 being pressed down may be included. As described above, the latch mechanism 12 is disabled by pressing down the latch mechanism 12, and hence a state may be achieved in which "a latch mechanism is not provided".

In the foregoing embodiment, an example is described in which the plug holding parts 21a, 21b, 21e, and 21f protrude on the adapter side to protrude the end portion of the ferrule 11 of the second optical connector plug 10B on the adapter side. However, the form in which the end portion of the ferrule 11 of the second optical connector plug 10B protrudes can be appropriately modified. For example, a configuration may be provided in which the protrusion amount of the ferrule 11 from the second optical connector plug 10B is longer than the protrusion amount of the ferrule 11 from the first optical connector plug 10A, and hence the end portion of the ferrule 11 of the second optical connector plug 10B protrudes on the adapter side.

In the foregoing embodiment, an example is described in which one connector plug group U includes six optical connector plugs 10 and two connector plug groups U are provided. However, the number of the optical connector plugs 10 included in the connector plug group U and the number of the connector plug group U can be appropriately modified. For example, four connector plug groups U including six optical connector plugs 10 may be provided.

In the foregoing embodiment, an example is described in which the second optical connector plugs 10B are disposed on both end sides in the intersecting direction A2 and the first optical connector plugs 10A are disposed between the plurality of second optical connector plugs. However, the positions at which the first optical connector plugs 10A and the second optical connector plugs 10B are disposed can be appropriately modified. For example, the first optical connector plugs 10A may be disposed on both end sides in the intersecting direction A2, and the second optical connector plugs 10B may be disposed between the plurality of first optical connector plugs 10A.

REFERENCE SIGNS LIST

1 Optical connector
10 Optical connector plug
10A, 40A First optical connector plug
10B, 40B Second optical connector plug
11, 41 Ferrule
12 Latch mechanism
12a Contacting part
12b Engaging part
12c Fixing portion
13, 43 Housing
20 Holder
21a, 21b, 21c, 21d, 21e, 21f Plug holding part
21g Inclined plane
22 Support part
22a Main face
23 Pressing part
30 Grip part
31 Opening
A1 Connecting direction
A2 Intersecting direction
A3 Direction
D Protrusion amount
U Connector plug group

The invention claimed is:

1. An optical connector comprising at least three or more optical connector plugs collectively connected to a plurality of adapters along a connecting direction, wherein
the optical connector includes a holder configured to hold the at least three or more optical connector plugs,
the optical connector plugs and the adapters are arranged in an intersecting direction intersecting with the connecting direction,
the optical connector plugs include a first optical connector plug and a second optical connector plug,
any of the first optical connector plug and the adapter to which the first optical connector plug is connected has a latch mechanism configured to engage the first optical connector plug with the adapter, and
any of the second optical connector plug and the adapter to which the second optical connector plug is connected does not have a latch mechanism configured to engage the second optical connector plug with the adapter, wherein
both of the first optical connector plug and the second optical connector plug have an optical fiber and a ferrule configured to hold the optical fiber, and
an end portion of the ferrule of the second optical connector plug is located on the adapter side beyond an end portion of the ferrule of the first optical connector plug.

2. The optical connector according to claim 1, wherein the second optical connector plugs are individually disposed on both end sides in the intersecting direction, and the first optical connector plugs are disposed between a plurality of the second optical connector plugs.

3. The optical connector according to claim 1, wherein the second optical connector plug protrudes on the adapter side beyond the first optical connector plug.

4. The optical connector according to claim 1, comprising a grip part configured to grip the holder.

5. The optical connector according to claim 1, comprising at least one or more connector plug groups having six optical connector plugs arranged in the intersecting direction.

6. An optical connector comprising at least three or more optical connector plugs collectively connected to a plurality of adapters along a connecting direction, wherein the optical connector includes a holder configured to hold the at least three or more optical connector plugs, the optical connector plugs and the adapters are arranged in an intersecting direction intersecting with the connecting direction, the optical connector plugs include a first optical connector plug and a second optical connector plug, any of the first optical connector plug and the adapter to which the first optical connector plug is connected has a latch mechanism configured to engage the first optical connector plug with the adapter, and any of the second optical connector plug and the adapter to which the second optical connector plug is connected does not have a latch mechanism configured to engage the second optical connector plug with the adapter, the holder including a plurality of plug holding parts, wherein some of the plurality of plug holding parts hold first optical connector plugs, and the remaining of the plurality of plug holding parts hold second optical connector plugs, and the plug holding parts holding the second optical connecting plugs protrude on the adapter side beyond the plug holding parts holding the first optical connector plugs.

7. The optical connector according to claim 6, wherein the second optical connector plugs are individually disposed on both end sides in the intersecting direction, and the first optical connector plugs are disposed between a plurality of the second optical connector plugs.

8. The optical connector according to claim 6, wherein both of the first optical connector plug and the second optical connector plug have an optical fiber and a ferrule configured to hold the optical fiber, and an end portion of the ferrule of the second optical connector plug is located on the adapter side beyond an end portion of the ferrule of the first optical connector plug.

9. The optical connector according to claim 8, wherein the second optical connector plug protrudes on the adapter side beyond the first optical connector plug.

10. The optical connector according to claim 6, comprising a grip part configured to grip the holder.

11. The optical connector according to claim 6, comprising at least one or more connector plug groups having six optical connector plugs arranged in the intersecting direction.

* * * * *